(12) United States Patent
Wang

(10) Patent No.: US 7,339,487 B2
(45) Date of Patent: Mar. 4, 2008

(54) STRUCTURE OF METER

(76) Inventor: Ching-Hung Wang, 1F, No. 25, Lane 40, Sec. 3, Chung Yang N. Rd., Pei-Tou District, Taipei City 112 (TW)

(*) Notice: Subject to any disclaimer, the term of this patent is extended or adjusted under 35 U.S.C. 154(b) by 304 days.

(21) Appl. No.: 11/196,261

(22) Filed: Aug. 4, 2005

(65) Prior Publication Data

US 2007/0030160 A1  Feb. 8, 2007

(51) Int. Cl.
- B60Q 1/00 (2006.01)
- G08B 19/00 (2006.01)
- G08B 21/00 (2006.01)
- G08B 23/00 (2006.01)
- G01R 19/00 (2006.01)
- G01R 11/04 (2006.01)

(52) U.S. Cl. ............ 340/679; 340/438; 340/439; 340/441; 340/459; 340/461; 340/637; 340/688; 340/870.02; 340/870.09; 324/76.11; 324/157

(58) Field of Classification Search ........ 340/438–439, 340/441, 459, 461, 637, 679, 688, 870.02, 340/870.09; 324/76.11, 157

See application file for complete search history.

(56) References Cited

U.S. PATENT DOCUMENTS

| | | | | |
|---|---|---|---|---|
| 5,841,359 A | * | 11/1998 | Grilk | ............... 340/688 |
| 6,464,464 B2 | * | 10/2002 | Sabini et al. | ............... 417/19 |
| 6,538,577 B1 | * | 3/2003 | Ehrke et al. | ........... 340/870.02 |
| 6,847,300 B2 | * | 1/2005 | Yee et al. | ............... 340/584 |
| 6,853,309 B1 | * | 2/2005 | Schroter | ............... 340/870.02 |
| 7,064,679 B2 | * | 6/2006 | Ehrke et al. | ........... 340/870.02 |
| 2006/0091877 A1 | * | 5/2006 | Robinson et al. | ........ 324/76.11 |

* cited by examiner

Primary Examiner—Benjamin C. Lee
Assistant Examiner—Lam Pham
(74) Attorney, Agent, or Firm—Birch, Stewart, Kolasch & Birch, LLP

(57) ABSTRACT

An improved structure of meter, comprising a casing, a circuit board provided in the casing and having a connecting unit for connecting to an external machine, a central processor provided on the circuit board for transmitting the signals among individual unit and machine, a display unit for displaying the condition of the external machine, a correcting memory unit for detecting and memorizing the signals from various machines, a driving control unit for saving the variations in signals from various machines, a monitoring unit for presetting an alarm value and producing an alarm signal, a wireless transmitting unit for receiving the signals transmitted from the wireless controller, and an illuminating unit connected to the central processor for corresponding to both ends of the meter ring and the display unit. With the above arrangement, the meter of the present invention can be adapted to various kinds of machines and instruments.

3 Claims, 5 Drawing Sheets

STRUCTURE OF METER

FIELD OF INVENTION

The present invention relates to an improved structure of meter, and especially, to a structure of a multiple-function meter suitable for various kinds of machines.

BACKGROUND OF THE INVENTION

In daily life, various kinds of monitoring instruments are widely used, such as thermometers for measuring temperature, speedometers used in cars, or the like. However, in some cases, for example, the meter is not precise enough, the monitoring range is too small, or the operation is not convenient etc., it is necessary to install another meter to measure the desired data. In the above situations, a case that there is error between the represented data and the actual data, or the user cannot determine the represented data will be inevitably happened. Such a situation happens because the driving circuits or controlling programs of the monitoring meter are incompatible with the monitored instruments, or encryption has been made to the signal source of the instrument so that the meter cannot read the signal, causing the monitoring instrument to falsely determinate or unable to determine. Hereinafter, only a speedometer is used for illustration.

For a speedometer made from the original factory, the range of the speed per hour is 0~180 km/h, and the range of the revolution meter is 0~8000 rpm. When a user needs to additionally install a speedometer whose range of the speed is 0~220 km/h or a revolution meter whose range is 0~9000 rpm, he will find that there is error between the results of this new revolution meter and those of the original revolution meter. Therefore, when the detecting programs or driving signals of a monitoring instrument are designed based on general criteria, such instrument can only be used in some kinds of cars. If such instrument is used in the cars designed by different criteria, false determination or inefficient determination can be happened.

Further, there are two categories of cores used in the electronic meters, i.e. air core and stepper motor. These cores can be driven by some controlling programs or transistors associated with driving circuits. However, there are so many kinds of meters that each kind of meter needs a different component and associated driving circuit. As a result, the manufactures or the sellers have to store up a lot of components or products. Also, many components will prolong the manufacturing period.

Further, in the existing meters, signals are transmitted from the sensors to a control box, and compiled and transferred to the meter by encoding and packing the data. The meter is provided with a data processing IC and a signal transferring port therein, such that the data can be transferred to the meter by way of series connecting. The packed data is decoded by the individual meter, and the meter can be operated according to exclusive encoding. However, in practice, such operation has great drawbacks. That is, the meter cannot operate without a control box. In other words, the user should additionally buy a control box so as to operate the meter, resulting in a burden to the consumer.

The existing ways of illumination in meters can be categorized into "back light type" and "side light type". Besides, there are so many kinds of light sources, such as Tungsten Bulb, Cold Cathode Fluorescent Light (CCFL), Electro-luminescent Light, Light Emitting Diode (LED), etc., no matter which way of illumination and material are used, the main object is to achieve a clear and uniform illumination. However, when illuminating, since the above light sources in the meter panel can only create lighting spots at certain points, the whole meter panel cannot be uniformly illuminated. Further, in the existing meters, an annular meter ring is often provided to press against the meter panel. Such meter ring only serves to press the meter panel without the other functions.

Further, in conventional monitoring meters, each kind of meter is produced for only one purpose. There is no monitoring meter having multiple purposes. Thus, the manufacturer should provide various kinds of methods for manufacturing all meters, such that each kind of meters having required purpose can be manufactured in a mass scale. Although each method can perform the mass production, the manufacture has to store up many components to fit various kinds of meters, resulting in high cost. Therefore, in practice, conventional meters cannot satisfy the above requirements.

SUMMARY OF THE INVENTION

The object of the present invention is to provide a multiple-function meter suitable for various kinds of machines by using a central processor, a display unit, a correcting memory unit, a driving control unit, a monitoring unit and a wireless transmitting unit.

Another object of the present invention is to automatically learn and correct by detecting the signals and programs produced from various machines.

Another object of the present invention is to integrate a plurality of meters into a multiple-function meter.

Another object of the present invention is to provide a multiple-function meter, after inputting various signals, being capable of adjusting optional switches to perform the corresponding alarm actions.

Another object of the present invention is to identify various kinds of meters by using a wireless controller so as to perform individual functions.

Another object of the present invention is to improve the illumination of the meter and make the light source uniform.

Another object of the present invention is to improve the ability of the meter ring to guide light.

In order to achieve the above objects, the present invention relates to an improved structure of meter, which comprises a casing provided with a meter ring and a transparent cover plate at one end, a circuit board provided in the casing and having a connecting unit for connecting to an external machine, a central processor provided on the circuit board for transmitting and controlling the signals transmission among individual unit and machine, a display unit connected to the central processor for displaying the condition of each machine, a correcting memory unit connected to the central processor for detecting and memorizing the operating signals from various machines, a driving control unit connected to the central processor for saving the required variations in signals from each machine, a monitoring unit connected to the central processor for presetting an alarm value and producing an alarm signal, a wireless transmitting unit connected to the central processor for receiving the signals transmitted from the wireless controller, and an illuminating unit connected to the central processor for corresponding to both ends of the meter ring and the display unit.

BRIEF DESCRIPTION OF THE DRAWINGS

The drawings disclose an illustrative embodiment of the present invention which serve to exemplify the various advantages and objects hereof, and are as follows.

DETAILED DESCRIPTION OF THE PREFERRED EMBODIMENT

Figure 1:
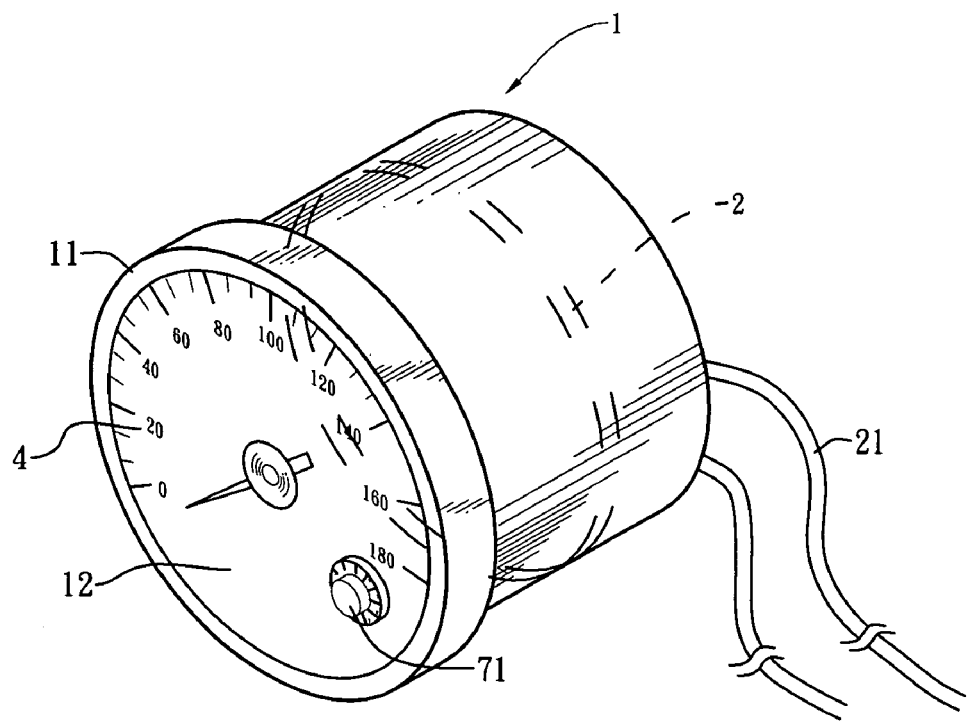
FIG. 1 is a perspective view of the external appearance of the present invention.
Figure 2:
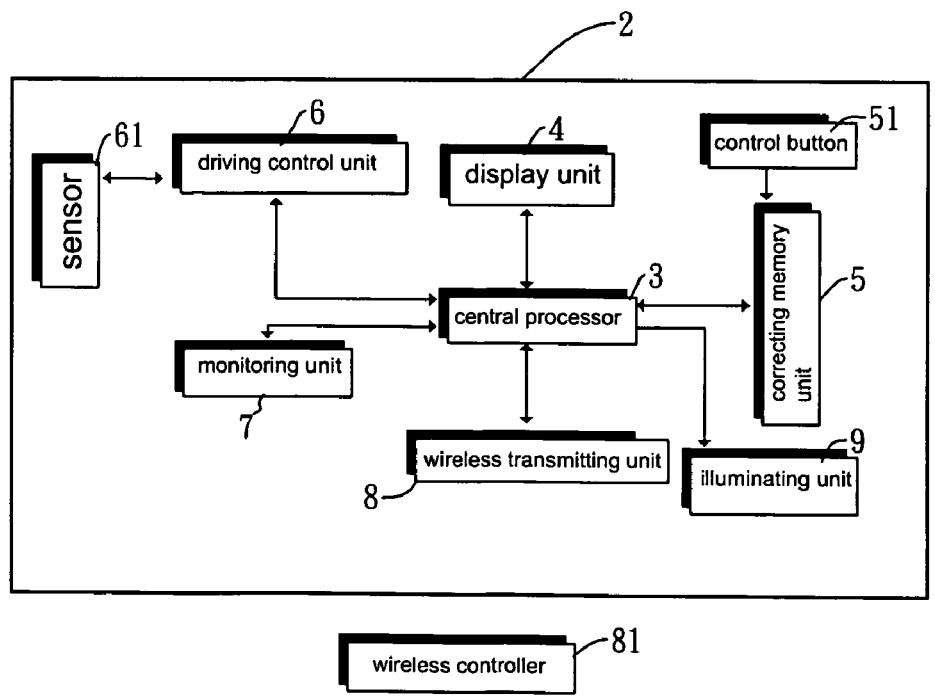
FIG. 2 is a schematic block view of the basic structure of the present invention.

FIG. 1 is a perspective view of the external appearance of the present invention, and FIG. 2 is a schematic block view of the basic structure of the present invention. As shown in the drawings, the present invention relates to an improved structure of meter comprising a casing 1, a circuit board 2, a central processor 3, a display unit 4, a correcting memory unit 5, a driving control unit 6, a monitoring unit 7, a wireless transmitting unit 8 and an illuminating unit 9. With the above arrangement, the meter can be suitable for various kinds of machines.

The casing is covered by a meter ring 11 at one end edge, and a transparent cover plate 12 is provided between the casing 1 and the meter ring 11.

The circuit board 2 is provided in the casing 1 with a connecting unit 21 for connecting to an external machine and exposing to the outside of the casing 1.

The central processor 3 is provided on the circuit board 2 for transmitting and controlling the signals transmission among each unit and machine.

The display unit 4 is connected to the central processor 3 for displaying the condition of the external machine.

The correcting memory unit 5 is connecting to the central processor 3 for detecting and memorizing the signals produced from the various machines. Further, the correcting memory unit 5 has a control button 51.

The driving control unit 6 is connected to the central processor 3 for saving the required variations in signals from various kinds of machines. The driving control unit 6 is associated with at least one sensor 61, and the number of the sensors is dependent on the required kind of meter.

The monitoring unit 7 is connected to the central processor 3 for presetting at least one alarm value and producing an alarm signal when achieving the preset alarm value. The monitoring unit 7 has a control button 71 provided on the display unit 7.

The wireless transmitting unit 8 is connected to the central processor 3 for receiving an operation signal transmitted from a wireless controller 81, thereby to select and operate various kinds of meters in the machine.

The illuminating unit 9 is connecting to the central processor 3 and comprised of one or more LED lamps 91 (DIP support type), so as to correspond to both ends of the meter ring and the display unit 4. With the above arrangement, an improve structure of meter is achieved.

Figure 3:
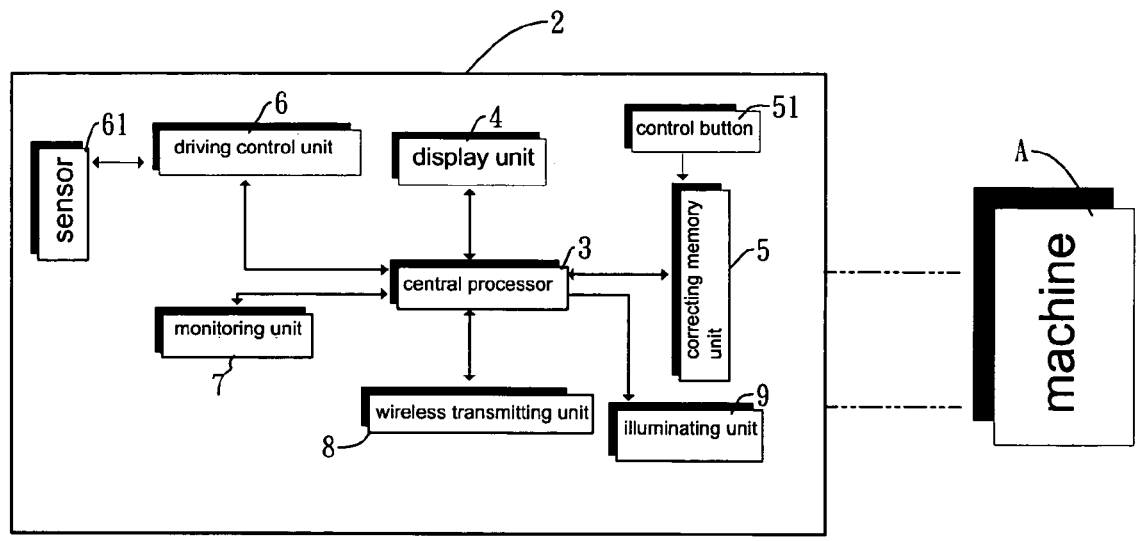
FIG. 3 is a schematic view of a first embodiment of the present invention.

FIG. 3 is a schematic view of a first embodiment of the present invention. As shown in the drawing, after the present invention is connected to an external machine A, the correcting memory unit 5 is used to perform the setting of various machines by the following steps: "multiplying", "dividing", "adding" or "subtracting" in the program for detecting signals; extracting the signal at a random point (or a specific point); making the signal as the base point, proportionally "multiplying", "dividing", "adding" or "subtracting" the remaining signals, and displaying the result after computing. When the signal source varies, the output of signals will also vary in proportion to such variation. As a result, no matter the forms for the signal source (number of pulse, voltage, resistance, or the like), all the signals can be correctly displayed after comparing and correcting.

For example, when the speed of a car is 100 km/h and the number of pulse is 10 Hz, it can be considered that the number of pulse is 1 Hz if the speed of the car is 10 km/h according to the rule of proportionality. When performing the comparing and correcting of the signals, and choosing a random point or a specific point as a base point, the relationship between the signal source and the represented value can be memorized by the central processor 3 after pressing the control button 51. If the meter displays the correct value after correcting, this means that the setting operation is completed. If an error occurs, it is necessary to perform the fine adjustment until the monitoring meter displays the correct value. Thereafter, all signal values of the monitored machine can be more completely and precisely displayed. An exemplary operation is described as follows:

The user installs a speedometer on the car, and finds that there is an error between this speedometer and that made by the original factory. Thus, he should perform the correction.

The user drives the car on the road or raises the car to spin four wheels on a support in a repair workshop to produce a speed signal, with reference to the speedometer made by the original factory, when the speed is increased to 100 km/h, the control button 51 is pressed to activate the correcting memory unit 5. After comparing by the central processor 3, if the presented value of the monitoring meter produced by the correcting memory unit is identical to that of the original speedometer, this means that the setting operation is completed. If a different value (e.g. 120 km/h or 80 km/h) is displayed, further adjustment should be performed to increase or decrease until the monitoring meter displays 100 km/h, this means that the correction is finally completed. Thereafter, the monitoring meter has permanently learned the output mode of signals of the monitored machine, and the signals can be transformed into the correct values to the user. After automatically comparing and correcting by the program, the monitoring meter can be adapted to various kinds of machines or instruments. The correcting memory unit 5 can get a more precise and larger range of monitoring values by the controlling and learning of the program, so as to satisfy various demands of users. Therefore, the high cost resulted from the adaptation to various monitored instruments or machines can be greatly reduced.

Figure 4:
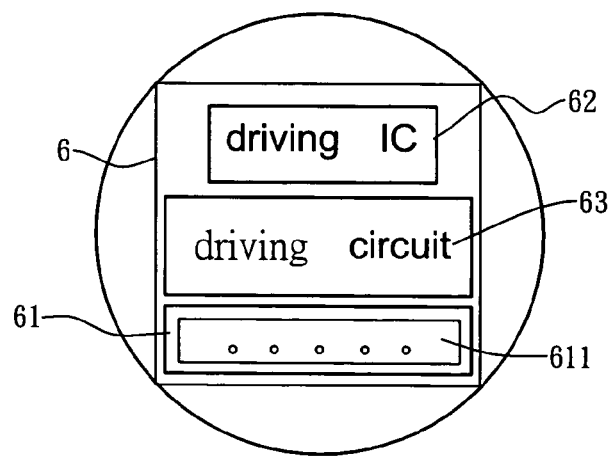
FIG. 4 is a schematic view of a second embodiment of the present invention.

FIG. 4 is a schematic view of a second embodiment of the present invention. As shown in the drawing, when using the driving control unit 6 of the present invention, the required variation of signals in the meter is input to the driving control unit 6 to form a database, and makes a driving IC 62. The components (such as resistor, capacitor, IC for regulating the voltage, diode, tantalum capacitor, ceramic capacitor etc.,) of the driving circuit 63 of the driving control unit 6 are provided on the same circuit board, and the signal input port of the sensor 61 can be a connector socket 611. According to the all data preset in the driving IC 62, the connector socket 611 of the sensor 61 can be defined as various signal pins, such as voltage signal, temperature signal and pressure signal. When the meter is intended to be used as a voltammeter, thermometer for water, or thermometer for oil, the sensor for detecting the voltage, water temperature, oil temperature of the external machine A should be connected to the pins for the voltage signal, water temperature signal or oil temperature signal, such that only one driving IC can perform the driving without other meters. With connecting to the corresponding sensor, the driving IC can determine which kind of signals are induced, thus can determine which kind of meter is used, and performs the corresponding action.

Figure 5:
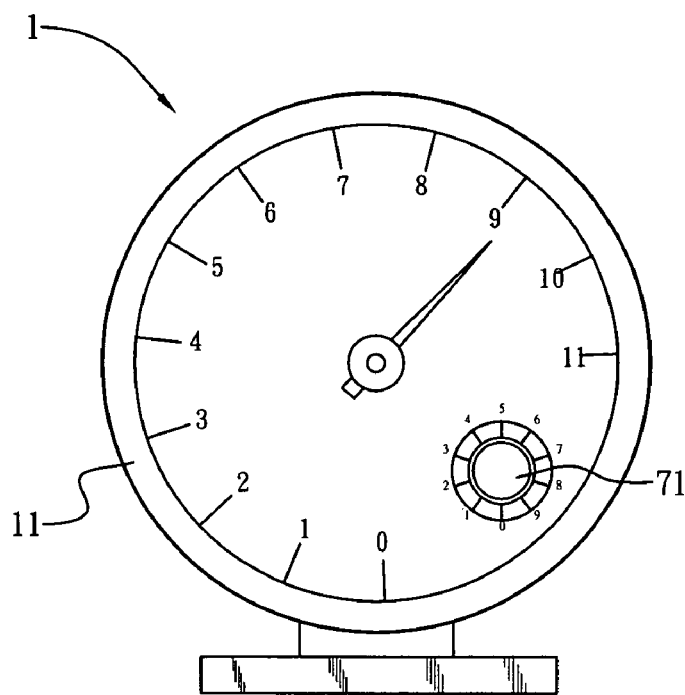
FIG. 5 is a schematic view of a third embodiment of the present invention.

FIG. 5 is a schematic view of a third embodiment of the present invention. As shown in the drawing, the monitoring unit 7 of the present invention can be used in a meter for measuring the water temperature, oil pressure or the voltage depending on the setting of the central processor 3. When the monitoring unit 7 is actually used, the alarm temperature, pressure, voltage and suggesting points for alarm signal in each preset value can be set by the control button 71. Therefore, according to the input exclusive signals and the selection of the alarm control button, the meter can perform suitable actions corresponding to the demands of the user.

Figure 6:
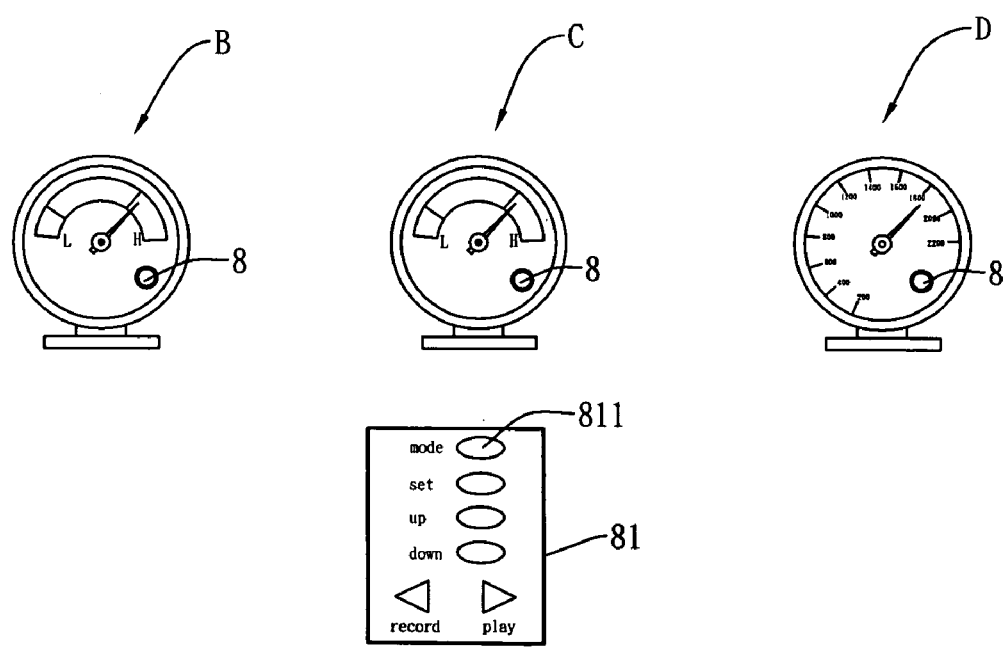
FIG. 6 is a schematic view of a fourth embodiment of the present invention.

FIG. 6 is a schematic view of a fourth embodiment of the present invention. As shown in the drawing, when the wireless transmitting unit 8 of the present invention is used in various meters in the machine, the data of each meter is packed and separately defined in the central processor 3 via the wireless transmitting unit 8.

For example, the data package 1 is defined as a meter B for water temperature; the data package 2 is defined as a meter C for oil temperature; and the data package 3 is defined as a voltage meter V. The identical key 811 of the wireless controller 81 is used as an operation tool. After pressing the key once, the meter enters a ready state. The key is pressed twice to open the data package 1 so that the meter for water temperature enters a ready state (a lamp illuminates or buzzing). The key is pressed third times to open the data package 2 so that the meter for oil temperature enters a set state (a lamp illuminates or buzzing). The key is pressed fourth times to open the data package 3 so that the voltage meter enters a set state (a lamp illuminates or buzzing). After using the above method to choose a suitable meter, the user can press other keys of the wireless controller to perform other actions.

Figure 7:
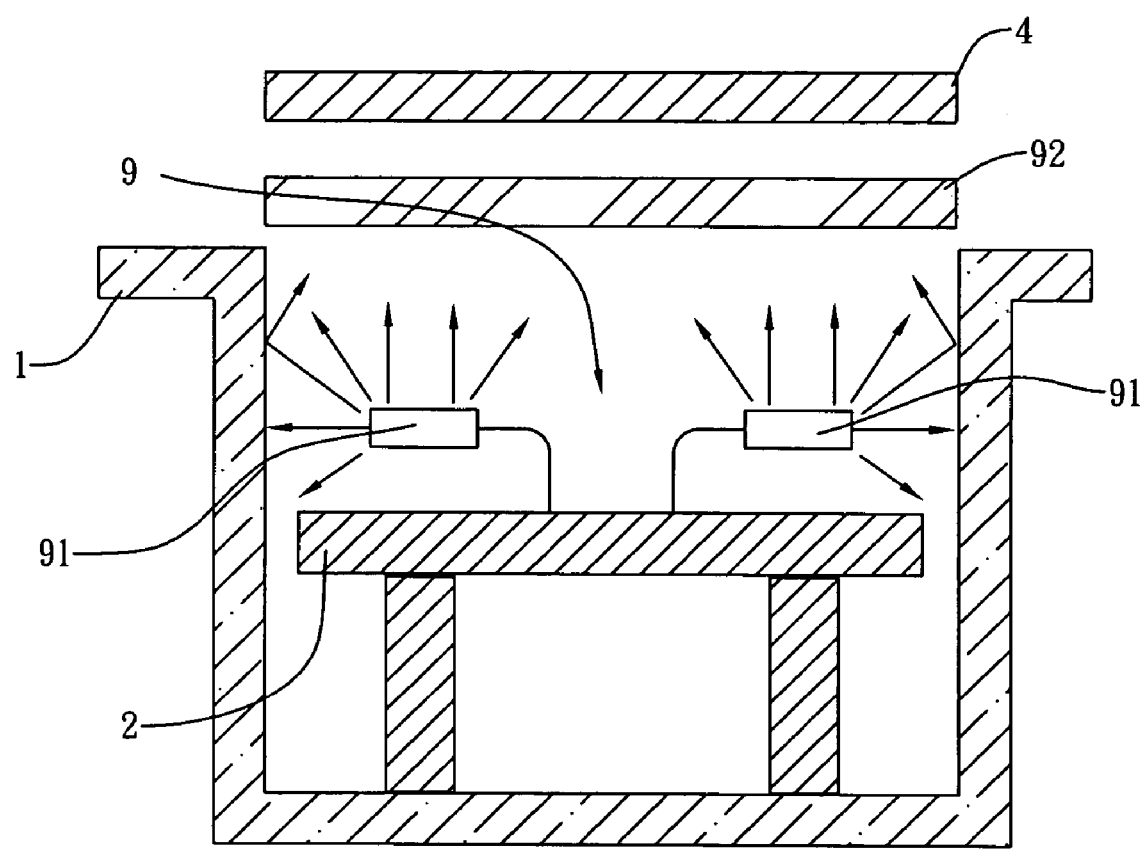
FIG. 7 is a schematic view of a fifth embodiment of the present invention.

FIG. 7 is a schematic view of a fifth embodiment of the present invention. As shown in the drawing, when using the present invention, a LED lamp 91 (DIP support type) bent in right angle and a light guiding plate 92 for diffusing the light can be provided to diffuse the light of the LED lamp 91 forwardly or transversely. When the light source irradiates the periphery of the meter cashing 1 and the light guiding plate 92 and reflect and diffuse, the light can be sufficiently and uniformly guided to the display unit 4. As a result, the meter is seen to be greatly luminous with brightness and uniformity.

Figure 8:
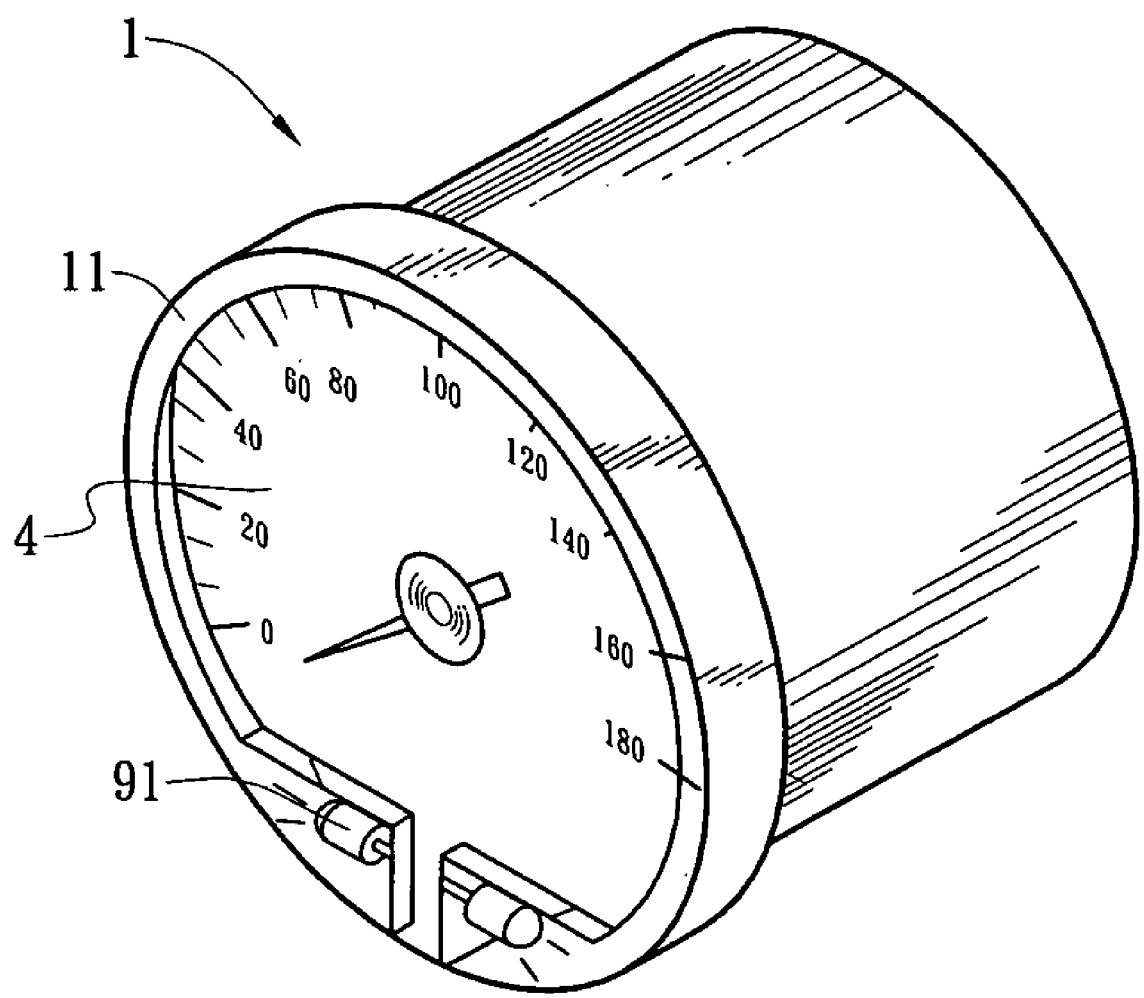
FIG. 8 is a perspective view of an external appearance of the sixth embodiment of the present invention.

FIG. 8 is a schematic view of a sixth embodiment of the present invention. As shown in the drawing, the meter ring 11 of the present invention can be made from light-guiding materials. A general illuminant or LED lamp 91 (DIP support type) can be inserted into both ends or at least one position of the meter ring 11 to serve as a light source, the light beams emitted from the light source will extend forwardly along the annular meter ring 11, resulting in a further illumination for the display unit 4. Also, electronic and voice-controlled circuit (not shown) can be provided in the meter, and the output end of the voice-controlled circuit is connected to the light source of the meter ring, so that the light source will become lighter or darker according to the volume of ambient sound sources (such as music, talk, or engine).

According to the above, the improved structure of meter of the present invention employs the central processor, the display unit, the correcting memory unit, the driving control unit, the monitoring unit and the wireless transmitting unit to be suitable for various kinds of machines or instruments. Thus, the present invention indeed involves inventive steps and practicability, and conforms to the requirements for a patent.

Many changes and modifications in the abovementioned embodiment of the present invention can, of course, be carried out without departing from the scope thereof. Accordingly, to promote the progress in science and useful arts, the present invention is disclosed and is intended to be limited only by the scope of the appended claims.

What is claimed is:

1. An improved structure of meter, comprising:
   a casing provided with a meter ring at one end edge, and a transparent cover plate provided between the casing and the meter ring;
   a circuit board provided in the casing and having a connecting unit for connecting to an external machine;
   a central processor provided on the circuit board for transmitting and controlling the signals transmission among individual unit and machine;
   a display unit connected to the central processor for displaying the condition of the external machine;
   a correcting memory unit connected to the central processor for detecting and memorizing the operating signals from various machines;
   a driving control unit connected to the central processor for saving the required variations in signals from various kinds of machines;
   a monitoring unit connected to the central processor for presetting an alarm value and producing an alarm signal when the alarm value is arrived;
   a wireless transmitting unit connected to the central processor for receiving the operating signals transmitted from the wireless controller, thereby to identify and choose the various meters in the machine; and
   an illuminating unit, connected to the central processor and composed of at least one LED lamp (DIP support type), for corresponding to both ends of the meter ring and the display unit.

2. The improved structure of meter according to claim 1, wherein the driving control unit is associated with at least one sensor.

3. The improved structure of meter according to claim 1, wherein the monitoring unit has a control button provided on the display unit.

* * * * *